United States Patent
Rueblinger et al.

(10) Patent No.: US 9,310,609 B2
(45) Date of Patent: Apr. 12, 2016

(54) AXIALLY REINFORCED FLEXIBLE SCAN ELEMENT

(71) Applicant: Hand Held Products, Inc., Fort Mill, SC (US)

(72) Inventors: Gregory Rueblinger, Stratford, NJ (US); Kevin Saber, Sewell, NJ (US); Erik Van Horn, Ocean View, NJ (US); Colleen P. Gannon, Marcellus, NY (US); Mark Meagher, Mount Laurel, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/340,627

(22) Filed: Jul. 25, 2014

(65) Prior Publication Data

US 2016/0025967 A1     Jan. 28, 2016

(51) Int. Cl.
*G02B 26/00*     (2006.01)
*G02B 26/10*     (2006.01)

(52) U.S. Cl.
CPC ................ *G02B 26/105* (2013.01)

(58) Field of Classification Search
CPC .................................... G02B 26/105
USPC .......... 359/198.1, 199.1, 199.3, 212.1, 213.1, 359/214.1
See application file for complete search history.

(56) References Cited

U.S. PATENT DOCUMENTS

| | | | |
|---|---|---|---|
| 4,632,501 A * | 12/1986 | Glynn ......................... | 359/199.1 |
| 5,184,245 A | 2/1993 | Murakami et al. | |
| 5,274,491 A | 12/1993 | Collins et al. | |
| 5,373,148 A * | 12/1994 | Dvorkis et al. .......... | 235/462.36 |
| 5,422,471 A | 6/1995 | Plesko | |
| 5,557,444 A | 9/1996 | Melville et al. | |
| 5,579,148 A | 11/1996 | Nishikawa et al. | |
| 5,581,067 A | 12/1996 | Grosfeld et al. | |
| 5,596,446 A | 1/1997 | Plesko | |
| 5,614,706 A | 3/1997 | Bard et al. | |
| 5,767,666 A | 6/1998 | Asada et al. | |
| 5,870,219 A | 2/1999 | Plesko | |
| 6,112,993 A | 9/2000 | Svetal et al. | |
| 6,128,122 A * | 10/2000 | Drake et al. ............... | 359/224.1 |
| 6,198,565 B1 | 3/2001 | Iseki et al. | |

(Continued)

FOREIGN PATENT DOCUMENTS

WO     2013163789 A1     11/2013
WO     2013173985 A1     11/2013

(Continued)

OTHER PUBLICATIONS

U.S. Appl. No. 13/367,978, filed Feb. 7, 2012, (Feng et al.); now abandoned.

(Continued)

*Primary Examiner* — Frank Font
(74) *Attorney, Agent, or Firm* — Additon, Higgins & Pendleton, P.A.

(57) ABSTRACT

A flexible scan element for a laser scanner is disclosed. The flexible can element may be made from a non-linear elastomeric material that twists sufficiently for scan operation but resists unwanted motion from shock/vibration through the use of a rigid motion-limiting member encapsulated, at least partially, within the body of the flexible scan element. In this way, no external components are required for limiting excess motion.

13 Claims, 8 Drawing Sheets

(56) References Cited

U.S. PATENT DOCUMENTS

| | | | |
|---|---|---|---|
| 6,201,629 B1 | 3/2001 | McClelland et al. | |
| 6,230,976 B1 | 5/2001 | Sautter et al. | |
| 6,257,491 B1 | 7/2001 | Tan et al. | |
| 6,353,492 B2 | 3/2002 | McClelland et al. | |
| 6,375,358 B1 | 4/2002 | Maekawa et al. | |
| 6,404,313 B2 | 6/2002 | Asada | |
| 6,527,180 B1 | 3/2003 | Dvorkis et al. | |
| 6,637,657 B2 | 10/2003 | Barkan et al. | |
| 6,832,725 B2 | 12/2004 | Gardiner et al. | |
| 6,897,990 B2 | 5/2005 | Yagi et al. | |
| 6,900,925 B2 | 5/2005 | Kato et al. | |
| 6,924,914 B2 | 8/2005 | Kato et al. | |
| 6,969,005 B2 | 11/2005 | Otsubo | |
| 7,007,850 B2 | 3/2006 | Aizawa et al. | |
| 7,038,834 B2 | 5/2006 | Kato et al. | |
| 7,057,783 B2 | 6/2006 | Kato et al. | |
| 7,128,266 B2 | 10/2006 | Zhu et al. | |
| 7,159,783 B2 | 1/2007 | Walczyk et al. | |
| 7,182,262 B2 | 2/2007 | Wood et al. | |
| 7,221,493 B2 | 5/2007 | Fujii et al. | |
| 7,310,176 B2 | 12/2007 | Kato et al. | |
| 7,394,583 B2 | 7/2008 | Akedo et al. | |
| 7,408,690 B2 | 8/2008 | Mizoguchi et al. | |
| 7,413,127 B2 | 8/2008 | Ehrhart et al. | |
| 7,416,126 B2 | 8/2008 | Wittenberg et al. | |
| 7,420,721 B2 | 9/2008 | Takeuchi | |
| 7,548,362 B2 | 6/2009 | Miyagawa et al. | |
| 7,551,339 B2 | 6/2009 | Mochizuki | |
| 7,593,029 B2 | 9/2009 | Satoh et al. | |
| 7,599,105 B2 | 10/2009 | Nakajima | |
| 7,726,575 B2 | 6/2010 | Wang et al. | |
| 7,733,551 B2 | 6/2010 | Murata et al. | |
| 7,775,433 B2 | 8/2010 | Ando | |
| 8,035,876 B2 * | 10/2011 | Bernstein et al. | 359/199.3 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 * | 3/2013 | Plesko | 359/199.3 |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 9,158,951 B2 * | 10/2015 | Feng | G06K 7/10633 |
| 2005/0179973 A1 * | 8/2005 | Nanjyo et al. | 359/198 |
| 2007/0063048 A1 | 3/2007 | Havens et al. | |
| 2007/0153348 A1 * | 7/2007 | Roux | G02B 7/00 359/198.1 |

(56) References Cited

U.S. PATENT DOCUMENTS

| | | |
|---|---|---|
| 2008/0185432 A1 | 8/2008 | Caballero et al. |
| 2009/0134221 A1 | 5/2009 | Zhu et al. |
| 2009/0185251 A1* | 7/2009 | Chen et al. .............. 359/199.3 |
| 2009/0251754 A1* | 10/2009 | Choi et al. .............. 359/214.1 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0069365 A1* | 3/2011 | Edmonds .............. 359/199.3 |
| 2011/0169999 A1 | 7/2011 | Grunow et al. |
| 2011/0202554 A1 | 8/2011 | Powilleit et al. |
| 2012/0002259 A1* | 1/2012 | Plesko .............. 359/200.7 |
| 2012/0111946 A1 | 5/2012 | Golant |
| 2012/0138685 A1 | 6/2012 | Qu et al. |
| 2012/0147345 A1* | 6/2012 | Buis .............. G03F 7/70116 355/66 |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0200158 A1* | 8/2013 | Feng .............. G06K 7/10633 235/462.36 |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0025584 A1 | 1/2014 | Liu et al. |
| 2014/0027518 A1 | 1/2014 | Edmonds et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/376,472, for an Encoded Information Reading Terminal Including HTTP Server filed Aug. 4, 2014, (Lu); 30 pages.

U.S. Appl. No. 13/771,508 for an Optical Redirection Adapter, filed Feb. 20, 2013 (Anderson); 26 pages.

U.S. Appl. No. 14/340,716 for an Optical Imager and Method for Correlating a Medication Package With a Patient, filed Jul. 25, 2014 (Ellis); 26 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

(56) References Cited

OTHER PUBLICATIONS

U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively to Trigger Signal Activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
U.S. Appl. No. 14/274,858 for Mobile Printer With Optional Battery Accessory, filed May 12, 2014, (Marty et al.); 26 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.

(56) References Cited

OTHER PUBLICATIONS

U.S. Appl. No. 29/494,725 for an In-Counter Barcode Scanner, filed Jun. 24, 2014 (Oberpriller et al.); 23 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Heil); 38 pages.

U.S. Appl. No. 14/339,708 for Laser Scanning Code Symbol Reading System, filed Jul. 24, 2014 (Xian et al.); 39 pages.

U.S. Appl. No. 14/379,057 for Method of Using Camera Sensor Interface to Transfer Multiple Channels of Scan Data Using an Image Format filed Aug. 15, 2014 (Wang et al.); 28 pages.

U.S. Appl. No. 14/283,282 for Terminal Having Illumination and Focus Control filed May 21, 2014 (Liu et al.); 31 pages.

* cited by examiner

AXIALLY REINFORCED FLEXIBLE SCAN ELEMENT

FIELD OF THE INVENTION

The present disclosure relates to improvements in laser scanners and more particularly to improvements in the flexible scan element employed therein.

BACKGROUND

Indicia readers fall into two main classes depending on the method used to capture barcodes. Area-image scanners (i.e., imaging scanners) use digital imaging technology to acquire images that are processed and analyzed to decode indicia (e.g., barcodes). Illumination requirements and complicated electronics limit this class of indicia readers.

Single-line laser scanners (i.e., laser scanners) scan barcodes with a collimated beam of light. As the light is swept across a barcode, the reflected light is modulated with the barcode's information. This reflected light can be decoded and the encoded data can be output to a host device. These scanners can be small, robust, and inexpensive. In addition, these scanners are especially useful for long-range scan applications.

The scan element is the mechanism used to sweep the laser beam. Various types of scan elements have been devised. Continued development in this area is driven by a need to optimize scan stability, precision, and reliability. Simple laser scanner designs that minimize cost and complexity are generally preferred, therefore minimizing the complexity of the scan element, while maintaining overall scanner performance, is important.

An oscillating scan mechanism is a scan mechanism in which a light source (e.g., laser or LED) is deflected (i.e., scanned) by a reciprocating mirror. The reciprocating motion is achieved by a force interaction between a permanent magnet and a nearby coil (i.e., a solenoid). When the coil is driven with an alternating electric current, the scan element oscillates back and forth. There are different types of scan elements, and the type of scan element used in a scanner depends on the application.

Shaft based scan elements use a mirror and a magnet attached to a rotational body. The rotational body can rotate about a fixed shaft or can be rigidly mounted to a rotatable shaft. Both configurations allow the mirror and magnet to rotate about the shaft axis.

Cantilever-hinge scan elements use a flexible material to form a hinge. This flexible hinge is affixed to one side of a mirror/magnet assembly. The other side of the hinge is attached to a fixed frame. Scanning consists of the oscillating motion enabled by a flexible hinge.

Torsional scan elements use a mirror and magnet mounted directly or indirectly to a shaft made from a flexible material. The shaft is generally affixed along the center axis of the mirror and magnet. The shaft may be twisted to allow the mirror and magnet to oscillate.

Nonlinear elastomeric materials can be used to form a torsional scan element (i.e., flexible scan element). This material is flexible, durable, and stable. The material may be molded to form a flexible scan element with various features. The molding process simplifies construction and reduces cost. The flexible properties of this material, however, may hinder performance when the flexible scan element is mechanically shocked (e.g., impact).

Shock causes excessive motion that could damage the flexible scan element or negatively affect the scanner's performance. Flexible scan elements can be protected from shock through external components that limit excessive scan element motion. These external components, however, must provide clearance to avoid interference with the moving parts involved with scanning motion.

A need, therefore, exists for a flexible scan element without excessive motion resulting from shock or impact and without the risk of unwanted contact between moving and fixed components.

SUMMARY

Accordingly, in one aspect, the present invention embraces a flexible scan element for a laser scanner; consisting of an upper mounting section, a lower mounting section, an upper hinge section connected to the upper mounting section, a lower hinge section connected to the lower mounting section, and a central section positioned between the upper and lower hinge sections. The upper and lower mounting sections are configured to attach to a fixed frame at an upper mounting point and a lower mounting point respectively. The upper and lower hinge sections are collinear and permit torsion about an axis of rotation between the upper and lower hinge sections. The central section is positioned between the upper and lower hinge sections and is configured to rotate about the axis of rotation. The central section is also configured to provide support for a mirror and a magnet. An elongated motion-limiting member is positioned along the axis of rotation and permits torsion of the flexible scan element, while limiting unwanted movement of the flexible scan element.

In an exemplary embodiment, the flexible scan element includes a mirror and a magnet connected to the central section to facilitate scanning.

In another exemplary embodiment, the flexible scan element's central section is contiguously connected to the upper and lower hinge sections.

In yet another exemplary embodiment, the flexible scan element's upper hinge section is contiguously connected to the upper mounting section, and the flexible scan element's lower hinge section is contiguously connected to the lower mounting section.

In another exemplary embodiment, the flexible scan element's (i) central section, (ii) respective upper and lower hinge sections, and (iii) respective upper and lower mounting sections form a unibody construction.

In still another exemplary embodiment, the flexible scan element is an injection-molded elastomeric polymer.

In another exemplary embodiment, the flexible scan element's motion-limiting member is encapsulated within the central section, the upper hinge section, and the lower hinge section.

In yet another exemplary embodiment, the motion-limiting member is fitted to the fixed frame.

In another exemplary embodiment, the flexible scan element's motion-limiting member is an elongated, rigid metallic rod fit into holes defined by the fixed frame.

In another exemplary embodiment, the flexible scan element's motion-limiting member is a flexible filament held in tension by the fixed frame.

In another aspect, the present invention embraces a torsional scan element for a laser scanner. The torsional scan element consists of a mirror and magnet attached to a flexible elongated body, which is attached, at either end, to an upper and a lower mounting point on a fixed frame. The flexible elongated body is configured to rotate about an axis of rotation in order to provide a scanning motion. The torsional scan element also has an elongated motion-limiting member positioned along the axis of rotation and at least partially encapsulated within the flexible elongated body. The elongated motion-limiting member is configured to limit excessive motion.

In an exemplary embodiment, the torsional scan element's body is injection-molded silicone rubber.

In another exemplary embodiment, the torsional scan element's motion-limiting member is a metallic pin encapsulated completely within the flexible elongated body yet not itself attached to the fixed frame.

In yet another exemplary embodiment, the torsional scan element's motion-limiting member has its respective ends fit into holes defined by the fixed frame.

In still another exemplary embodiment, the torsional scan element's motion-limiting member is a flexible filament held in tension by the fixed frame.

In yet another aspect, the present invention embraces an indicia-reader flexible scan element. The flexible scan element consists of a unitary, flexible body having a central section, an integrated elongated upper hinge, and an integrated elongated lower hinge, wherein the integrated elongated upper hinge and the integrated elongated lower hinge are contiguously positioned at opposite sides of the flexible body's central section. An elongated motion-limiting member is internally connected to the flexible body and defines an axis of rotation for the flexible body's central section, integrated elongated upper hinge, and integrated elongated lower hinge. The motion-limiting member permits torsion of the flexible body and restricts excessive movement of the flexible body in other directions. The flexible scan element also consists of a mirror for reflecting light, the mirror being affixed to the flexible body's central section and apart from the elongated motion-limiting member so as to rotate about the axis of rotation for the flexible body's central section, integrated elongated upper hinge, and integrated elongated lower hinge. The flexible scan element also consists of a magnet for providing a fixed magnetic field, the magnet being affixed to the flexible body's central section opposite the mirror and apart from the elongated motion-limiting member so as to cause torsion of the flexible scan element when subjected to an applied magnetic field.

In an exemplary embodiment, the flexible scan element's motion-limiting member is encapsulated by the unitary, flexible body.

In another exemplary embodiment, the flexible scan element's motion-limiting member is fitted to a fixed frame.

In yet another exemplary embodiment, the flexible scan element's motion-limiting member consists of an elongated, rigid metallic rod fit into holes defined by the fixed frame.

In still another exemplary embodiment, the flexible scan element's motion-limiting member comprises a flexible filament held in tension by the fixed frame.

DETAILED DESCRIPTION

The present invention embraces a flexible scan element for a laser scanner. The flexible scan element is a torsional scan element with an internal motion-limiting member for axial reinforcement. The flexible scan element's body is a molded elastomer, and the motion-limiting member is, at least partially, encapsulated within the body. In this way, the flexible scan element allows for normal scan motion but is resistant to unwanted motion (e.g., motion from shock).

Figure 1:
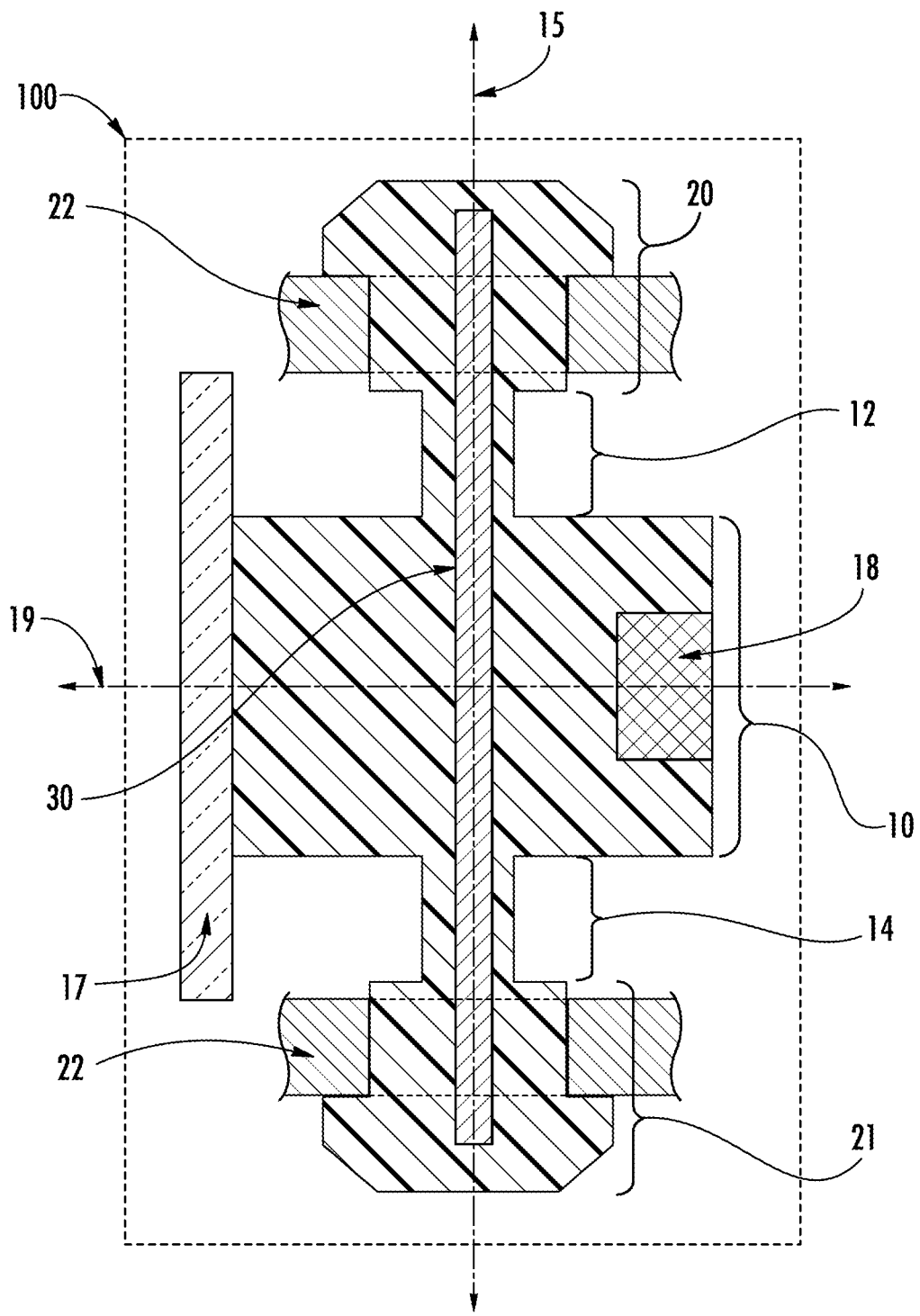
FIG. 1 graphically depicts a cross-sectional view of a first exemplary embodiment of a flexible scan element with a completely encapsulated motion-limiting member.

As shown in FIG. 1, the flexible scan element 100 can be formed (e.g., molded) from a nonlinear elastomeric material into a unitary body with five sections defined by their function. The arrangement of the sections from the body's bottom to the body's top are: lower mounting section 21, lower hinge section 14, central section 10, upper hinge section 12, and upper mounting section 20.

The mounting sections serve as attachment points for the scan element's flexible body to the frame 22. The mounting sections may have a non-circular cross-section to prevent the mounting sections from rotating when attached to the frame 22. When attached to a frame 22, the lower 21 and upper 20 mounting sections are anchored in place. The mounting sections can be held by various means. For example, the mounting sections could be clamped, bonded, or press fit into the rigid frame 22. When the flexible scan element 100 is twisted, the fixed points created by the mounting sections limit motion and restore the twisted element back to a neutral position when the twisting force is removed (i.e., like a torsion spring).

The hinge sections 12, 14 position the central section 10 within the frame 22 (e.g., centrally between the frame mounting points). The hinges also enable a torsional (i.e., twisting) movement of the flexible scan element 100. The upper hinge section 12 and the lower hinge section 14 are generally cylindrical with a cross-sectional area that is less than the cross-sectional area of the central section 10. The hinges are positioned collinearly on either side of the central section 10. The axis running through the center of the hinges and along their elongated direction forms the axis of rotation 15 for the flexible scan element 100.

The central section 10 bisects the upper 12 and lower 14 hinge sections. A mirror 17 and a magnet 18 are mounted on opposite sides of this section. The mirror 17 and the magnet 18 are positioned offset from the axis of rotation 15 in opposite directions along an orthogonal axis 19. The central section 10 is larger than either hinge section.

The central section 10 serves several purposes. First, the central section 10 acts as a support for both the mirror 17 and the magnet 18. There may be special features molded into this section to facilitate the attachment of these components. The central section 10 offsets the positions of the magnet 18 and the mirror 17 from the axis of rotation 15. This offset provides clearance for the mirror 17 to move freely during scanning and helps the twisting motion. Forces on the magnet 18 coupled with the offset lead to a torque that acts to twist the flexible body about the axis of rotation 15. The larger the offset is made, the greater the resulting torque that is produced.

The motion of the flexible scan element 100 is achieved using a magnetic force. A conducting coil can be fixedly mounted in proximity to the flexible scan element 100 so that when the coil is driven with a current (e.g., an alternating current), a magnetic field is created. This magnetic field forcibly interacts with the magnetic field of the magnet 18, and the resulting attractive or repulsive magnetic force causes a torque on the flexible scan element's body. The magnitude of this torque depends on the magnetic force and the lever arm created by the magnet's offset. The torque causes the flexible scan element to twist about the axis of rotation 15. The amount of twist depends on the flexibility of the scan-element material and the diameter of the hinge sections 12, 14. A back and forth twisting motion oscillates the mirror 17 about the axis of rotation 15, and a laser reflected off this oscillating mirror is scanned back and forth.

The flexible scan element body is typically molded using a nonlinear elastomeric material. For example, silicone rubber can be used. Silicone rubber is non-reactive, stable, moldable, and resistant to extreme environments. Silicone rubber's compatibility with molding allows the flexible scan element's body to be formed into a unitary shape, requiring no assembly.

The flexibility of silicone allows the material to twist and bend. Too much flexibility, however, can negatively affect the operation of a laser scanner. Mechanical shock can cause excessive motion that could affect barcode scanning negatively, damage the scanning mirror 17, or damage the flexible scan element 100. Motion limiting elements can be added externally to the flexible scan element 100 to limit excessive motion. These external motion limiters, however, may cause unwanted contact between moving and non-moving components and limit or alter the scanning motion. It is necessary, therefore, to limit the motion of the flexible scan element 100 without negatively affecting the regular scanning motion.

A motion-limiting member 30 can be integrated within the flexible scan element 100 along its axis of rotation 15. To integrate the motion-limiting member 30, the member could be placed in the flexible scan element's mold and over molded with the nonlinear elastomeric material. Over molding eliminates the need for any glue bond or post mold assembly. The internal integration removes the risk of unwanted contact between moving and non-moving components, while allowing for normal scanning motion. The motion-limiting member 30 is typically made from a rigid material (e.g., metal, plastic) and can be shaped like a thin rod. The surface of the motion-limiting member 30 can be textured, smooth, or a combination of both. While a rod is one possible embodiment, any rigid member substantially longer than it is wide would work as well. Likewise, the ends of the motion-limiting member are not constrained, and could be flat, rounded, or pointed. The motion-limiting member should, in general, allow for the torsional rotation (i.e., twisting about the axis of rotation) necessary for scanning, while minimizing any other motion. Any shape or material that allows these conditions to be met would be suitable for the motion-limiting member.

FIG. 1 graphically depicts a cross-sectional view of a first exemplary embodiment of a flexible scan element 100 with a motion-limiting member 30. Here the motion-limiting member 30 is completely encapsulated within the elastomeric material. The motion-limiting member 30 is not attached to the frame and therefore provides a shock mount with soft stops.

Figure 2:
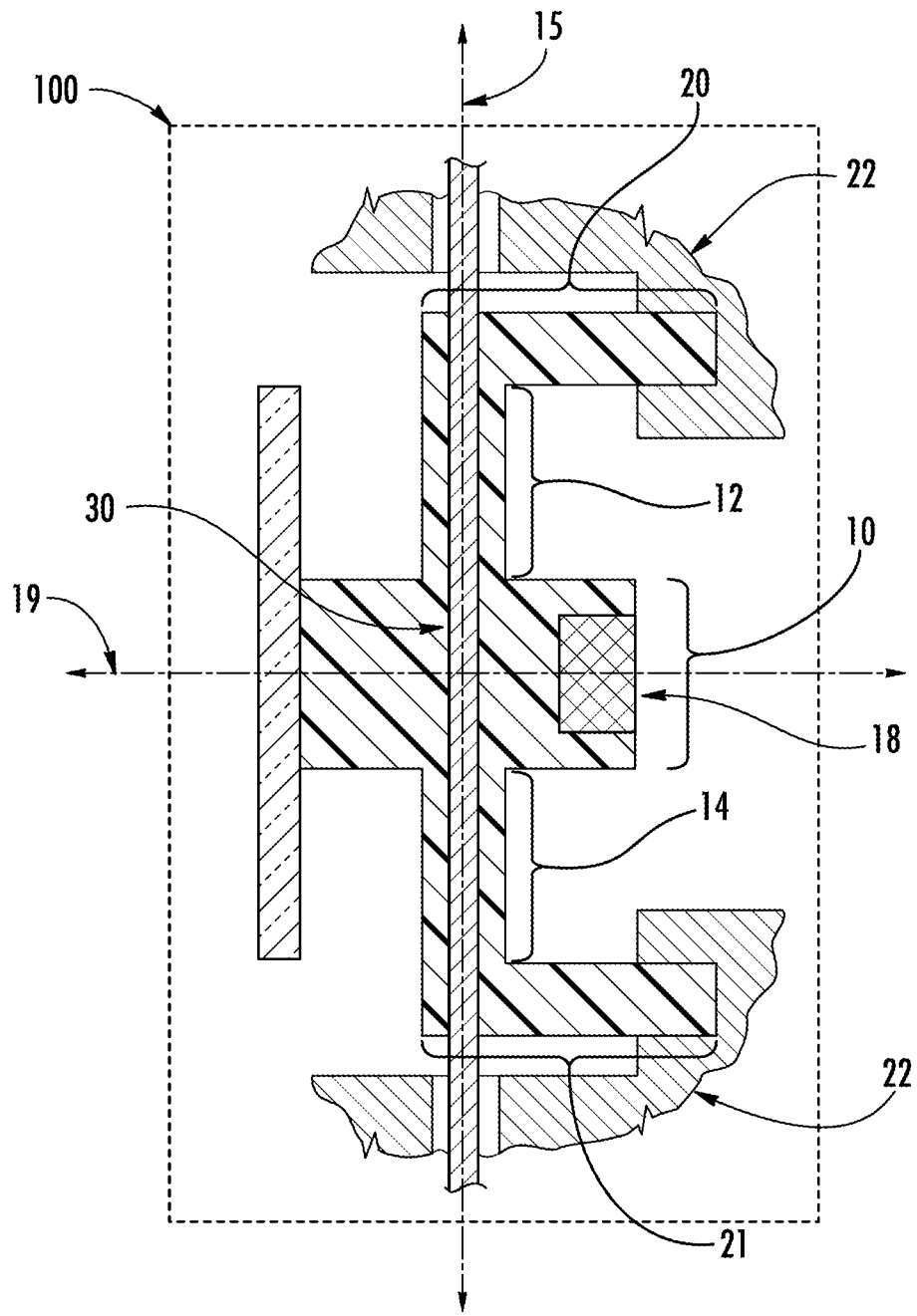
FIG. 2 graphically depicts a cross-sectional view of a second exemplary embodiment of a flexible scan element with a partially encapsulated motion-limiting member.

FIG. 2 graphically depicts a cross-sectional view of a second exemplary embodiment of a flexible scan element 100 with a motion-limiting member 30. Here the motion-limiting member is partially encapsulated. The flexible scan element 100 in FIG. 2 has the same sections as the first exemplary embodiment but is altered to accommodate the partially encapsulated motion-limiting member 30. In this embodiment, the upper mounting section 20 and the lower mounting section 21 are not collinear with the upper hinge 12 and the lower hinge 14. Instead, the mounting sections form an angle (e.g., orthogonal) with the axis of rotation 15. This bend in the body allows the motion-limiting member to extend beyond the elastomeric material at each end. The ends of the motion-limiting member mate with a hole in the fixed frame 22 via some fit (e.g., press fit). The upper 20 and lower 21 mounting sections are attached to the fixed frame 22 at different mounting points. The attachment of the motion-limiting member 30 to the frame 22 provides a rigid-mount with hard stops.

The motion-limiting member for the embodiment in FIG. 2 can be a made from a rigid material (e.g., metal or plastic). Alternatively, a flexible filament held under tension by the fixed frame 22 could be used as the partially encapsulated motion-limiting member.

The partially encapsulated rigid motion-limiting member 30 could be over molded or press fit into the elastomeric material. When press fit, the member is held in place by the compression of the material. When a flexible filament is used as the motion-limiting member 30, the filament is preferably over molded. Over molding adheres the motion-limiting member to the elastomeric material and eliminates the need for any bonding or post mold assembly.

Figure 3:
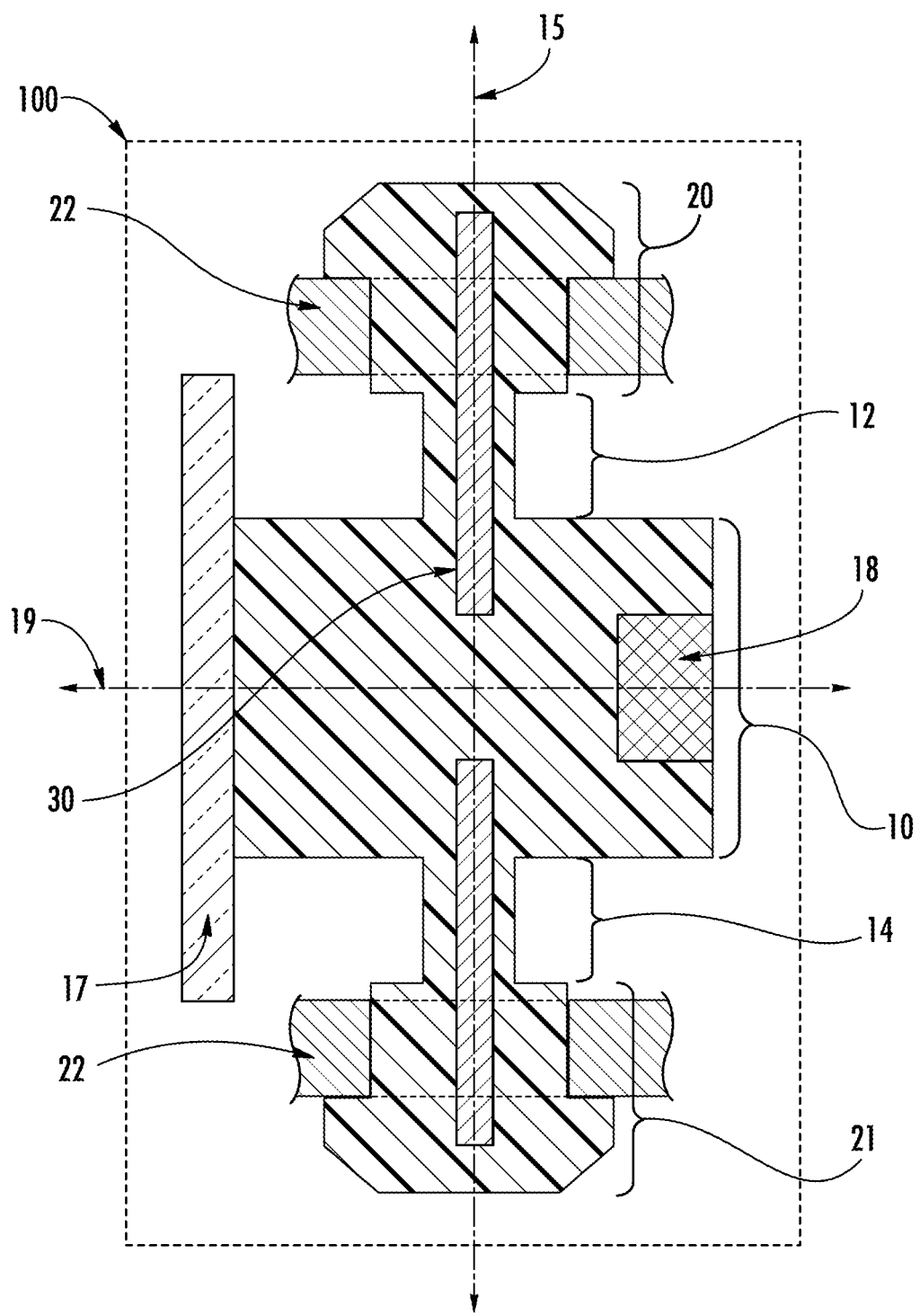
FIG. 3 graphically depicts a cross-sectional view of a third exemplary embodiment of a flexible scan element with a completely encapsulated, non-continuous, motion-limiting member.

Flexible scan elements may have a discontinuous motion-limiting member while still proving limiting function. FIG. 3 graphically depicts a cross-sectional view of an exemplary embodiment of a flexible scan element with a completely encapsulated motion-limiting member 30 that is discontinuous in the central section 10. This embodiment may offer advantages to scanning motion.

Figure 4:
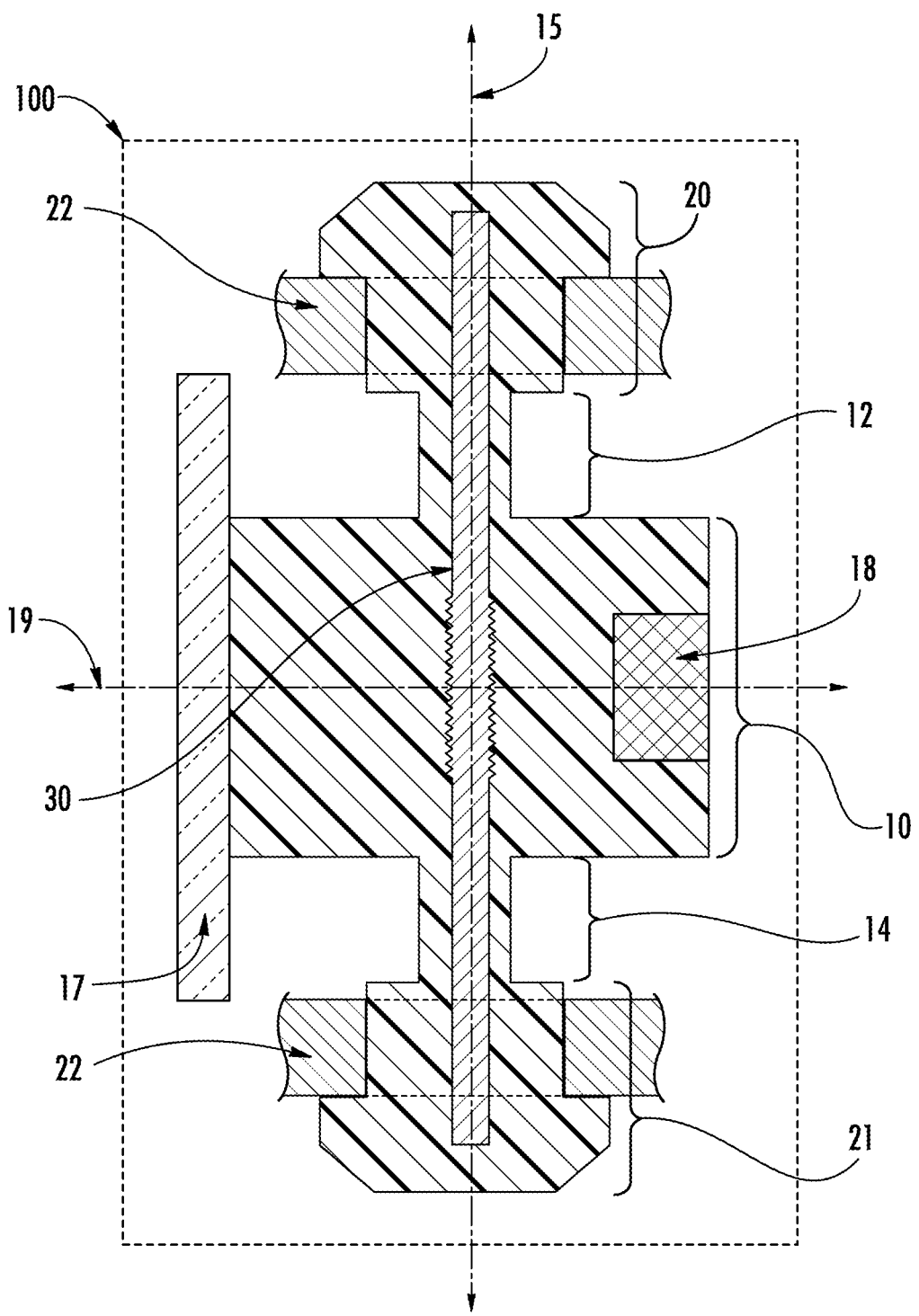
FIG. 4 graphically depicts a cross-sectional view of a fourth exemplary embodiment of a flexible scan element with a completely encapsulated motion-limiting member having surface roughness to prevent slippage.

In situations where over molding is not sufficient to grip the motion-limiting member 30 in order to prevent slippage along the axis of rotation 15, an embodiment that resists this movement may be necessary. To this end an embodiment, as shown in FIG. 4, having a motion-limiting member 30 with ridges or roughness may be utilized. Here the ridges engage with the molded material of the central section 10 to prevent slippage. While FIG. 4. Shows the motion limiting member's ridges in the central section other embodiments may be conceived. For example, multiple ridge sections spaced along the length of the motion limiting member 30 or a ridge section (or sections) located in portions of the flexible scan element other than the central section 10.

Figure 5:
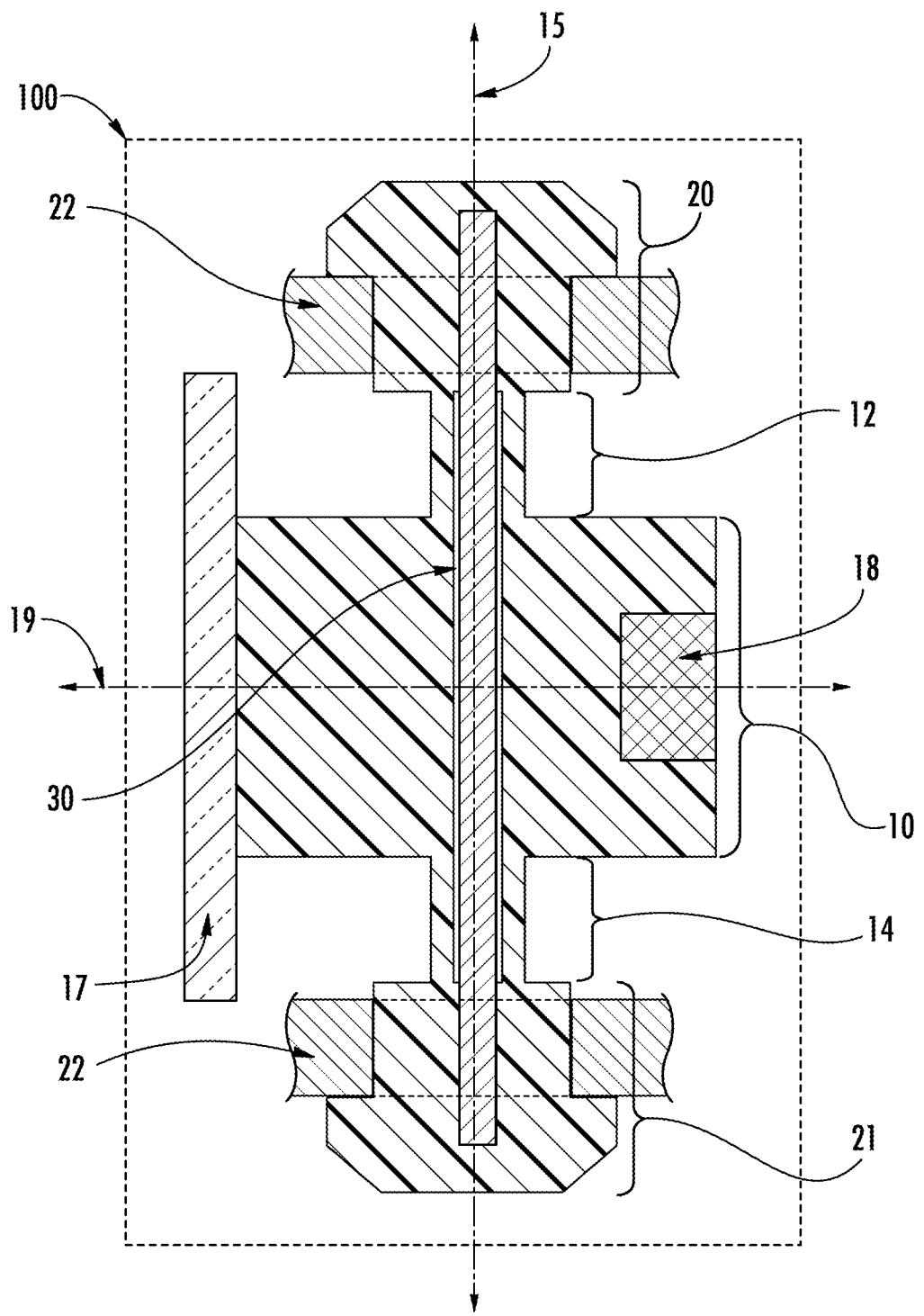
FIG. 5 graphically depicts a cross-sectional view of a fifth exemplary embodiment of a flexible scan element with a completely encapsulated motion-limiting member having clearance in the body and hinge sections.

To prevent the engagement between the unitary, flexible body and the motion-limiting member 30 from hindering torsional motion, a clearance hole for the motion-limiting member may be formed into the flexible body. In the embodiment shown in FIG. 5 the motion limiting member is provided clearance in the central section 10 and hinge sections 12, 14. This clearance may facilitate scanning in certain embodiments.

Figure 6:
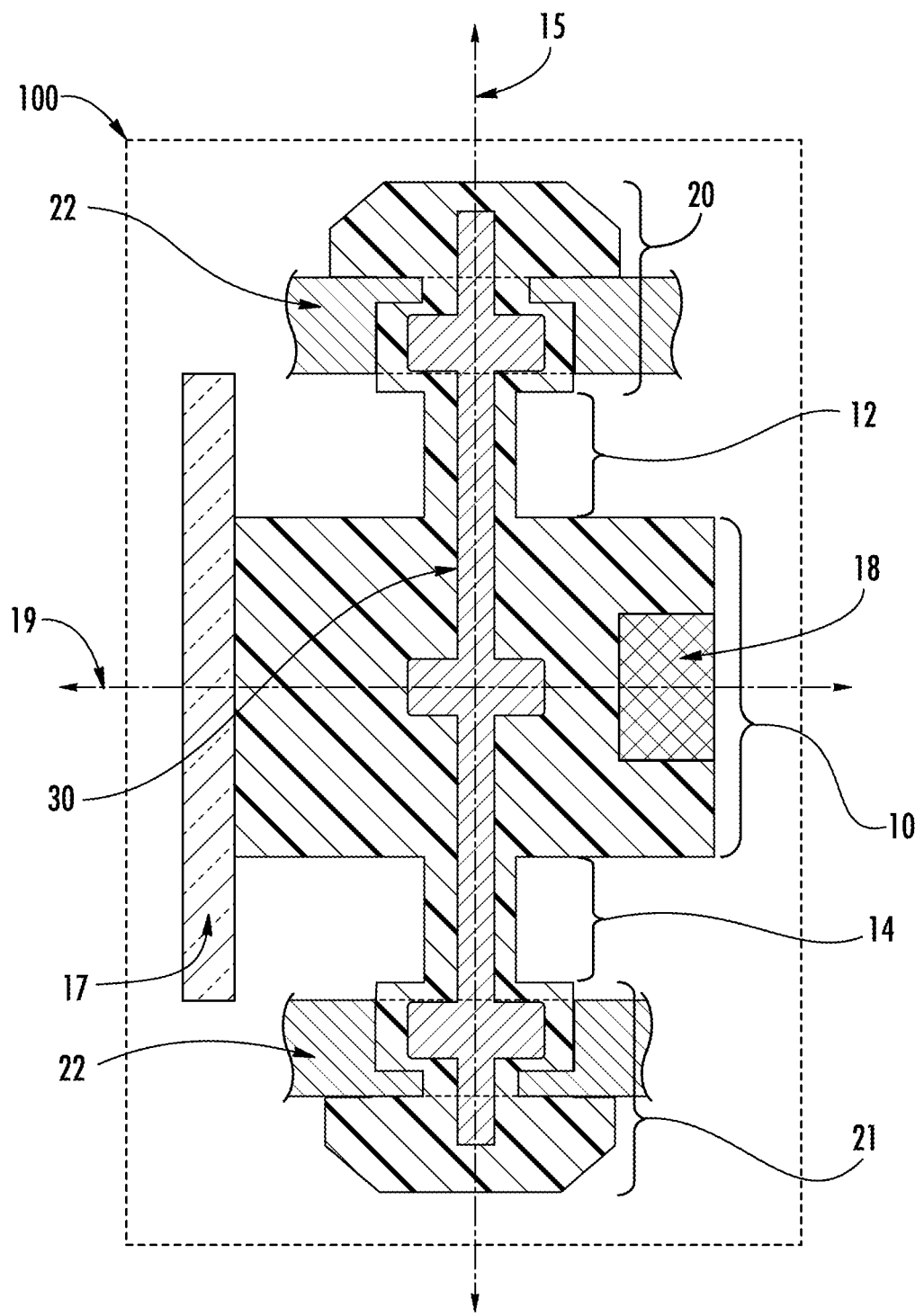
FIG. 6 graphically depicts a cross-sectional view of a sixth exemplary embodiment of a flexible scan element with a completely encapsulated motion-limiting member. The motion limiting member having limiting features to restrict unwanted movement.

In some embodiments, movement and slippage between the body and motion-limiting element may be minimized through the use of a motion-limiting member 30 with limiting features. For example, cross beams and/or spheroid shapes (i.e., ball) may be integrated with, or formed into, the motion-limiting member 30 to prevent motion and/or slippage along the axis of rotation. FIG. 6 shows one such possible embodiment. Here a cross beam is integrated with the motion-limiting member 30 in the central section 10 to limit slippage between the molded body and the motion-limiting member. To otherwise limit motion in this direction, spheroid shapes may be integrated with the motion-limiting members in the upper and lower mounting sections 20, 21. As shown in FIG. 6, the frame 22 includes an edge projected into the upper and lower mounting sections of the flexible body. These projections engage with the spheroid shapes to prevent body movement along the direction of the axis of rotation 15.

Figure 7:
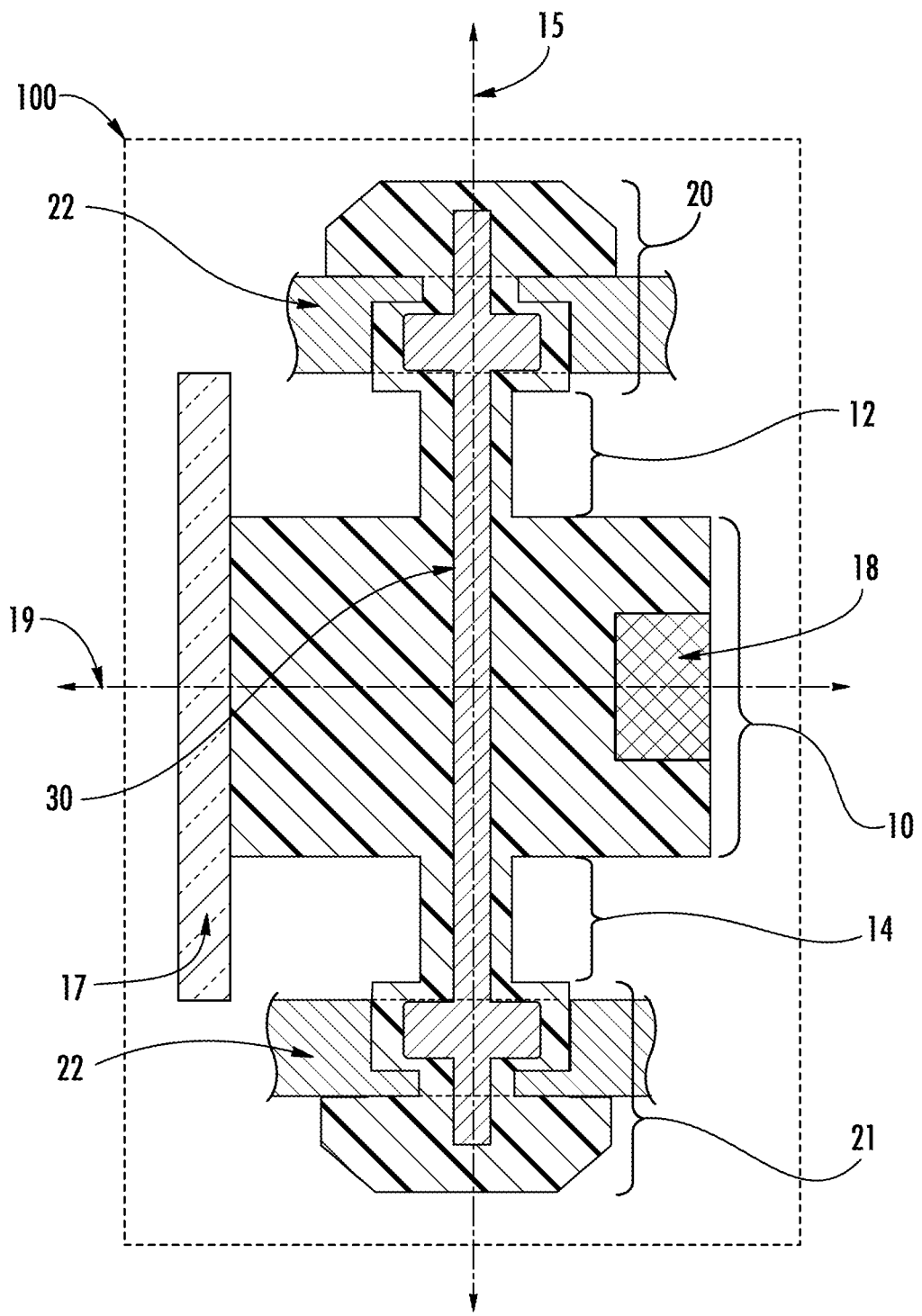
FIG. 7 graphically depicts a cross-sectional view of a seventh exemplary embodiment of a flexible scan element with a completely encapsulated motion-limiting member. The motion limiting member having limiting features to restrict unwanted movement.
Figure 8:
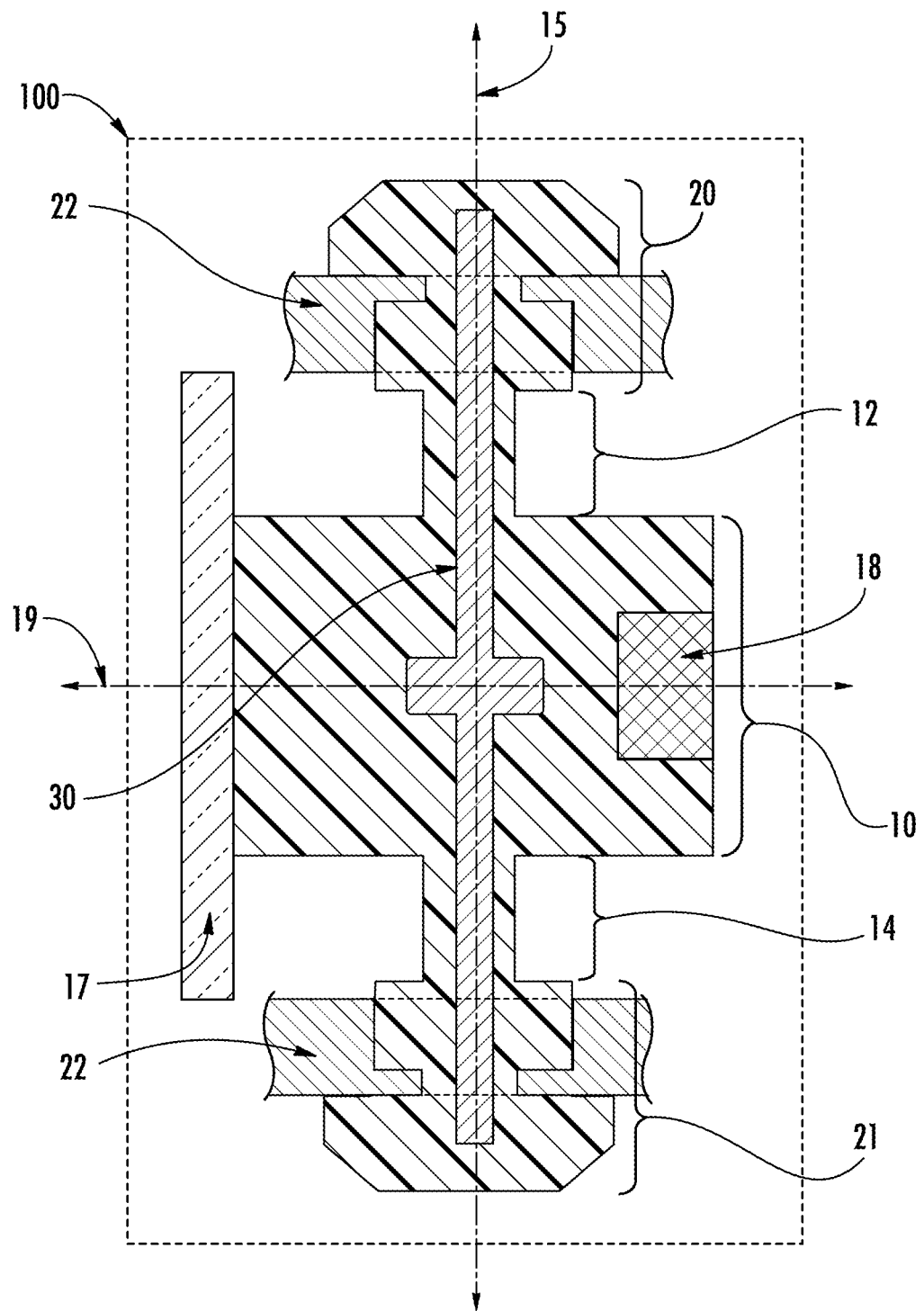
FIG. 8 graphically depicts a cross-sectional view of an eighth exemplary embodiment of a flexible scan element with a completely encapsulated motion-limiting member. The motion limiting member having limiting features to restrict unwanted movement.

Different combinations of these elements or techniques may be used in different embodiments to promote scanning motion while limiting motion from shock or vibration. For example, FIG. 7 illustrates a possible embodiment where the spheroid shapes are part of the motion limiting member in the mounting sections and when engaged with the frame projection limit motion. In this embodiment, however, no cross member is used. On the other hand, FIG. 8 illustrates a possible embodiment where the cross member is used to limit motion-limiting element slippage (with the body), but that have no other limiting features integrated with or formed into the motion-limiting member.

To supplement the present disclosure, this application incorporates entirely by reference the following patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; International Publication No. 2013/163789; International Publication No. 2013/173985; International Publication No. 2014/019130; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2011/0202554; U.S. Patent Application Publication No. 2012/0111946; U.S. Patent Application Publication No. 2012/0138685; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0070322; U.S. Patent Application Publication No. 2013/0075168; U.S. Patent Application Publication No. 2013/0082104; U.S. Patent Application Publication No. 2013/0175341; U.S. Patent Application Publication No. 2013/0175343; U.S. Patent Application Publication No. 2013/0200158; U.S. Patent Application Publication No. 2013/0214048; U.S. Patent Application Publication No. 2013/0256418; U.S. Patent Application Publication No. 2013/0257744; U.S. Patent Application Publication No. 2013/0257759; U.S. Patent Application Publication No. 2013/0270346; U.S. Patent Application Publication No. 2013/0278425; U.S. Patent Application Publication No. 2013/0287258; U.S. Patent Application Publication No. 2013/0292474; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306730; U.S. Patent Application Publication No. 2013/0306731; U.S. Patent Application Publication No. 2013/0306734; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0313326; U.S. Patent Application Publication No. 2013/0327834; U.S. Patent Application Publication No. 2013/0341399; U.S. Patent Application Publication No. 2013/0342717; U.S. Patent Application Publication No. 2014/0001267; U.S. Patent Application Publication No. 2014/0002828; U.S. Patent Application Publication No. 2014/0008430; U.S. Patent Application Publication No. 2014/0008439; U.S. Patent Application Publication No. 2014/0021256; U.S. Patent Application Publication No. 2014/0025584; U.S. Patent Application Publication No. 2014/0027518; U.S. Patent Application Publication No. 2014/0034723; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061305; U.S. Patent Application Publication No. 2014/0061306; U.S. Patent Application Publication No. 2014/0061307; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0075846; U.S. Patent Application Publication No. 2014/0076974; U.S. Patent Application Publication No. 2014/0078341; U.S. Patent Application Publication No. 2014/0078342; U.S. Patent Application Publication No. 2014/0078345; U.S.

Patent Application Publication No. 2014/0084068; U.S. Patent Application Publication No. 2014/0086348; U.S. Patent Application Publication No. 2014/0097249; U.S. Patent Application Publication No. 2014/0098284; U.S. Patent Application Publication No. 2014/0098792; U.S. Patent Application Publication No. 2014/0100774; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0104451; U.S. Patent Application Publication No. 2014/0106594; U.S. Patent Application Publication No. 2014/0106725; U.S. Patent Application Publication No. 2014/0108010; U.S. Patent Application Publication No. 2014/0108402; U.S. Patent Application Publication No. 2014/0108682; U.S. Patent Application Publication No. 2014/0110485; U.S. Patent Application Publication No. 2014/0114530; U.S. Patent Application Publication No. 2014/0124577; U.S. Patent Application Publication No. 2014/0124579; U.S. Patent Application Publication No. 2014/0125842; U.S. Patent Application Publication No. 2014/0125853; U.S. Patent Application Publication No. 2014/0125999; U.S. Patent Application Publication No. 2014/0129378;

U.S. patent application Ser. No. 13/367,978 for a Laser Scanning Module Employing An Elastomeric U-Hinge Based Laser Scanning Assembly, filed Feb. 7, 2012 (Feng et al.);

U.S. patent application Ser. No. 29/436,337 for an Electronic Device, filed Nov. 5, 2012 (Fitch et al.);

U.S. patent application Ser. No. 13/736,139 for an Electronic Device Enclosure, filed Jan. 8, 2013 (Chaney);

U.S. patent application Ser. No. 13/771,508 for an Optical Redirection Adapter, filed Feb. 20, 2013 (Anderson);

U.S. patent application Ser. No. 13/780,356 for a Mobile Device Having Object-Identification Interface, filed Feb. 28, 2013 (Samek et al.);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/047,896 for Terminal Having Illumination and Exposure Control filed Oct. 7, 2013 (Jovanovski et al.);

U.S. patent application Ser. No. 14/053,175 for Imaging Apparatus Having Imaging Assembly, filed Oct. 14, 2013 (Barber);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/118,400 for Indicia Decoding Device with Security Lock, filed Nov. 18, 2013 (Liu);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/222,994 for Method and Apparatus for Reading Optical Indicia Using a Plurality of Data filed Mar. 24, 2014 (Smith et al.);

U.S. patent application Ser. No. 14/230,322 for Focus Module and Components with Actuator filed Mar. 31, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/249,497 for Terminal Having Plurality of Operating Modes filed Apr. 10, 2014, Grunow et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.)

U.S. patent application Ser. No. 14/257,364 for Docking System and Method Using Near Field Communication filed Apr. 21, 2014, (Showering);

U.S. patent application Ser. No. 14/264,173 for Autofocus Lens System for Indicia Readers filed Apr. 29, 2014, (Ackley et al.);

U.S. patent application Ser. No. 14/274,858 for Mobile Printer with Optional Battery Accessory filed May 12, 2014, (Marty et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.);

U.S. patent application Ser. No. 14/345,735 for Optical Indicia Reading Terminal with Combined Illumination filed Mar. 19, 2014 (Ouyang);

U.S. patent application Ser. No. 29/486,759 for an Imaging Terminal, filed Apr. 2, 2014 (Oberpriller et al.); and U.S. patent application Ser. No. 14/355,613 for Optical Indicia Reading Terminal with Color Image Sensor filed May 1, 2014, (Lu et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A flexible scan element for a laser scanner, comprising:
a flexible body formed to have an upper mounting section, an upper hinge section, a central section, a lower hinge section, and a lower mounting section, all sections arranged collinearly along an axis of rotation, wherein:
the upper mounting section is configured to fixedly attach to a fixed frame at an upper mounting point and the lower mounting section is configured to fixedly attach to a fixed frame at a lower mounting point;
the upper hinge section is connected to the upper mounting section and the lower hinge section is connected to the lower mounting section, wherein the upper and lower hinge sections permit torsion about the axis of rotation;
the central section is positioned between the upper and lower hinge sections and configured to rotate about the axis of rotation, the central section configured to facilitate the attachment of a mirror and a magnet; and
an elongated motion-limiting member encapsulated within the flexible body and extending from at least the upper mounting section to the lower mounting section along the axis of rotation to permit torsion of the upper hinge section, the lower hinge section, and the central section and to limit unwanted movement of the upper hinge section, the lower hinge section, and the central section.

2. The flexible scan element according to claim 1, comprising a mirror and a magnet connected to the central section to facilitate scanning.

3. The flexible scan element according to claim 1, wherein the flexible scan element comprises an injection-molded elastomeric polymer.

4. The flexible scan element for a laser scanner according to claim 1, wherein the elongated motion-limiting member comprises at least one cross beam to prevent slippage along the direction of the axis of rotation.

5. The flexible scan element for a laser scanner according to claim 1, wherein the elongated motion-limiting member comprises ridges to prevent slippage along the direction of the axis of rotation.

6. A torsional-hinge flipper mirror for a laser scanner, comprising:
a flexible elongated body attached at either end to a fixed frame, wherein the flexible elongated body is configured to rotate about an axis of rotation in order to provide a scanning motion, and wherein the axis of rotation intersects the center of the flexible elongated body and is directed along the direction of the body's elongation; and an elongated motion-limiting member positioned along the axis of rotation and at least partially encapsulated within the flexible elongated body, wherein the elongated motion-limiting member engages with the fixed frame to limit excessive motion.

7. The torsional-hinge flipper mirror according to claim 6, wherein the body comprises injection-molded silicone rubber.

8. The torsional-hinge flipper mirror according to claim 6, wherein the motion-limiting member is a metallic pin encapsulated completely within the flexible elongated body yet not itself physically attached to the fixed frame.

9. The torsional hinge flipper mirror according to claim 6, wherein the motion-limiting member is a metallic pin that is partially encapsulated within the flexible elongated body and the respective ends of the motion-limiting member are fit into holes defined by the fixed frame.

10. The torsional hinge flipper mirror according to claim 6, wherein the motion-liming member is a flexible filament that is partially encapsulated within the flexible elongated body, the flexible filament held in tension by the fixed frame.

11. An indicia-reader flexible scan element, comprising:
a unitary, flexible body having a central section, an upper hinge section, and a lower hinge section, wherein the upper hinge section and the lower hinge section are contiguously positioned at opposite sides of the flexible body's central section;

an elongated motion-limiting member internally connected to the central section, the upper hinge section, and the lower hinge section, wherein the elongated motion-limiting member defines an axis of rotation for the flexible body's central section, upper hinge section, and lower hinge section so as to permit torsion of the flexible body about the axis of rotation and to limit movement of the flexible body in other directions;

a mirror for reflecting light, the mirror being affixed to the flexible body's central section and apart from the elongated motion-limiting member so as to rotate about the axis of rotation for the flexible body's central section, upper hinge section, and lower hinge section; and a magnet for providing a fixed magnetic field, the magnet being affixed to the flexible body's central section opposite the mirror and apart from the elongated motion-limiting member so as to cause torsion of the flexible scan element when subjected to an applied magnetic field.

12. The flexible scan element according to claim 11, wherein the elongated motion-limiting member comprises a rigid metallic rod extending beyond the flexible body to fit at either end into holes defined by a fixed frame.

13. The flexible scan element according to claim 11, wherein the elongated motion-limiting member comprises a flexible filament extending beyond the flexible body and held in tension by a fixed frame.

* * * * *